United States Patent [19]

Barzilai et al.

[11] Patent Number: 5,040,176
[45] Date of Patent: Aug. 13, 1991

[54] INTRA-NODE PACING FOR HIGH SPEED NETWORKS

[75] Inventors: Tsipora P. Barzilai, Millwood; Mon-Song Chen, Katonah; Bharath K. Kadaba, Peekskill; Marc A. Kaplan, Purdys, all of N.Y.

[73] Assignee: International Business Machines Corporation, Armonk, N.Y.

[21] Appl. No.: 416,330

[22] Filed: Sep. 29, 1989

[51] Int. Cl.⁵ .................... H04J 3/24; H04J 3/12; H04Q 11/04
[52] U.S. Cl. ...................... 370/94.1; 370/60; 370/110.1
[58] Field of Search .............. 370/94.1, 94.3, 60, 370/60.1, 94.2, 110.1

[56] References Cited
U.S. PATENT DOCUMENTS
4,926,415  5/1990  Tawara et al. ............... 370/94.1

OTHER PUBLICATIONS

Andrew S. Tannenbaum, Computer Networks, 2nd ed., Prentice Hall, 1988, sec. 4.4, pp. 223-224.

Primary Examiner—Douglas W. Olms
Assistant Examiner—Wellington Chin
Attorney, Agent, or Firm—Douglas W. Cameron

[57] ABSTRACT

A method for reducing transmission polling overhead of packets within a node of a communications network. This invention involves setting session ready bits in the line adaptor modules of the node. These bits are then used to inform a given module as to which modules of the node have packets that are bound for the given module. A given module of the node will not transmit a pacing message (YT control message) to another module unless it knows that the other module has a packet to transmit to the given module.

6 Claims, 4 Drawing Sheets

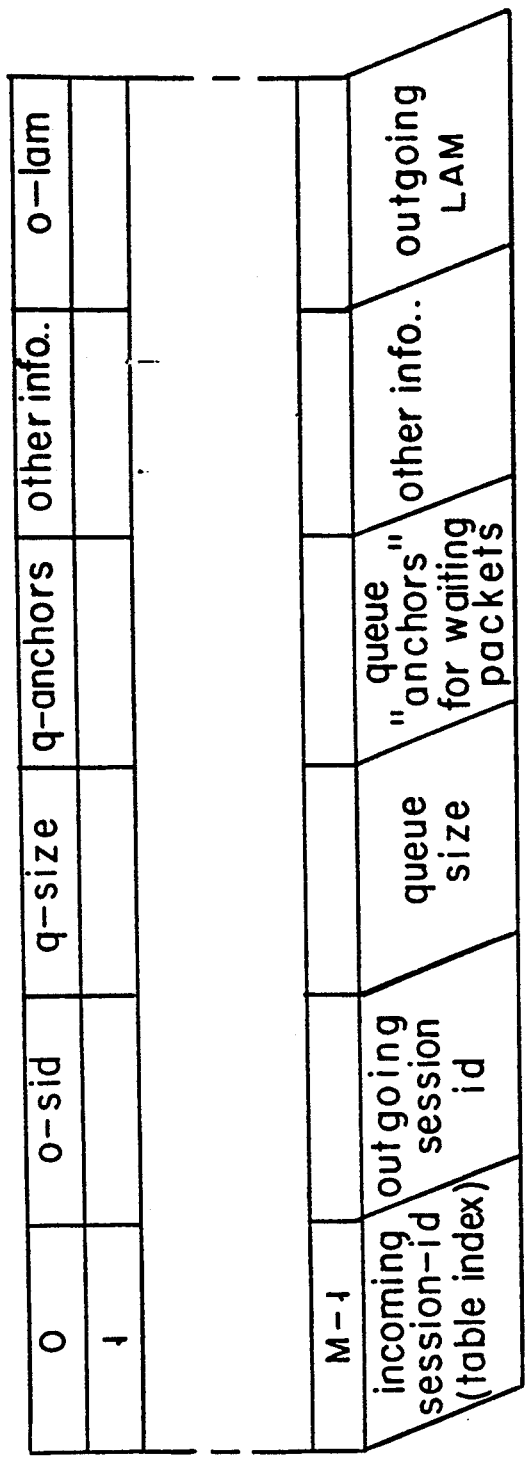
FIG. 3.1
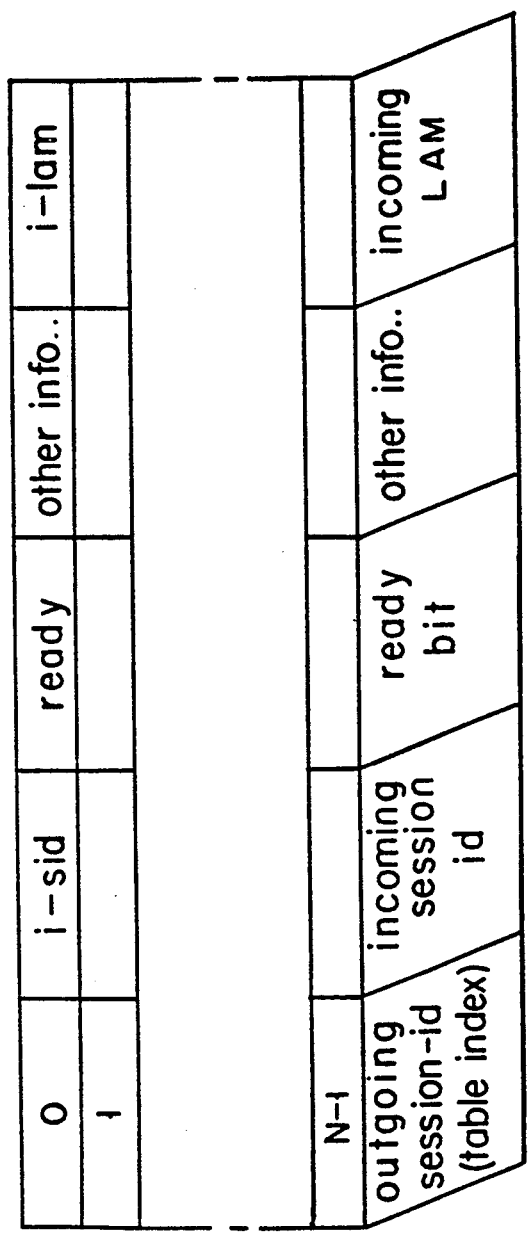
FIG. 3.2

ISOLATE SR CONTROL MESSAGE
FIG. 4.1 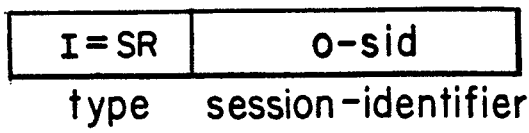
type   session-identifier
YT CONTROL MESSAGE
FIG. 4.2 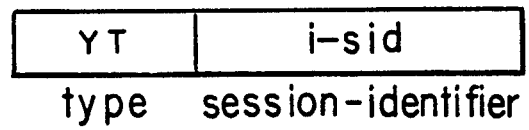
type   session-identifier
DATA PACKET WITHOUT SR PIGGYBACKED
FIG. 4.3 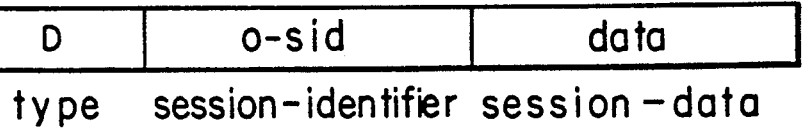
type   session-identifier   session-data
DATA PACKET WITH SR PIGGYBACKED
FIG. 4.4 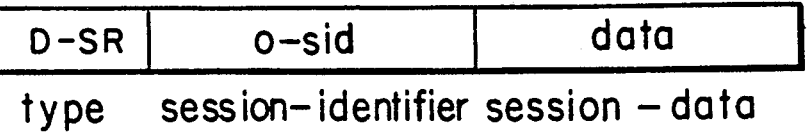
type   session-identifier   session-data

INTRA-NODE PACING FOR HIGH SPEED NETWORKS

TECHNICAL FIELD

This invention generally relates to a method of transmitting packets between line adaptor modules of a network node. More specifically, each module stores information (ready bits) as to which other modules of the node have the packets to transmit to it. A given module of the node will not receive a signal (YT control message) from another module of the node unless the other module knows that the given module has a packet to transmit to the other module.

BACKGROUND OF THE INVENTION

One of the sources of delay in the transmission of a packet through a multi-node communications network is the need to switch the packet at various nodes of the network. Such delays increase the need for additional bandwidth and buffer space.

Many intra-node pacing techniques have been developed to reduce intra-node switching delays. One such method is described in the following reference: Andrew S. Tannenbaum, *COMPUTER NETWORKS*, 2nd ed., Prentice Hall, 1988, Sec. 2.7.1.

All of the pacing techniques known in the art, however, are inefficient because of the overhead involved in transmitting from an input line adaptor module to a output line adaptor module of a switching node. This inefficiency occurs because all of the pacing schemes in the art will send a polling signal to an incoming line adaptor module from an outgoing line adaptor module without knowing whether or not the incoming line adaptor module has packets to transmit to the outgoing line adaptor module. Therefore, a need exists for a more efficient intra-node pacing scheme to reduce delays and overhead in the transmission of packets through multi-node networks.

SUMMARY OF THE INVENTION

It is, therefore, an object of this invention to provide a more efficient intra-node pacing technique.

More specifically, it is an object of this invention to reduce polling overhead caused by switching a packet from incoming module of a node to an outgoing module of the node.

Accordingly, the present invention provides a method of transmitting packets between line adaptor modules of a network node. With this invention, a session ready (SR) control message is sent from one module of the node to another module of the node if the one module has at least one packet to send to the other module. When the other module receives the SR control message, it sets a ready bit to a ready equals yes state, which indicates that the one module has least one packet in its buffers to transmit to the other module. If the ready bit in the other module is set to the ready equals yes state, then the other module transmits a your turn (YT) control message to the one module. Finally, packet will be transmitted from the one module to the other module if the YT control message is received by the one module.

BRIEF DESCRIPTION OF THE DRAWINGS

FIGS. 3.1 and 3.2 are schematic illustration of the incoming and outgoing session tables of the line adaptor modules.

FIGS. 4.1–4.4 are schematic representation of the SR and YT control messages. Also shown are data packets with and without an SR control message.

DESCRIPTION OF THE PREFERRED EMBODIMENT

Overview of the High Speed Network Node Hardware

Figure 1:
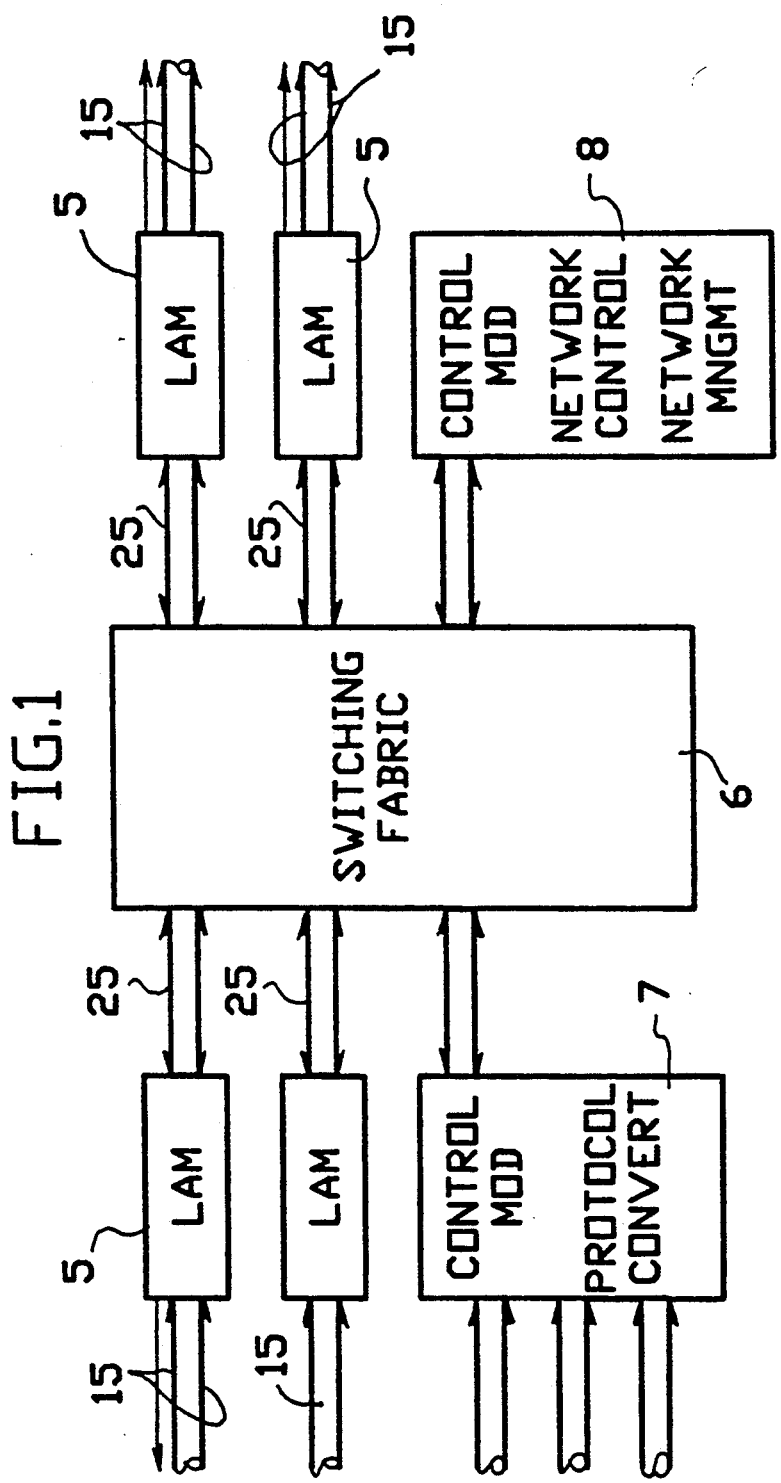
FIG. 1 is a schematic illustration of a node of a network showing the line adaptor modules the switching fabric and the control modules.

Referring to FIG. 1, each network node consists of several line adapter modules (LAMs) 5, control modules 7 and 8, and a switching "fabric" 6, that provides any-to-any connectivity among the LAMs. The switching fabric can be a bus, crossbar switch, communications ring, optical switch or any other switching means. Also, shown are the control and data lines 25 between the LAMs and the switching fabric. An implementation of a Network Node must also include appropriate power supply, harness and/or connectors for attaching communications transmission lines to the LAMs, and a housing cabinet and/or rack to hold all of the above.

FIG. 1 also shows the organization of the main components of a Network Node. Each LAM 5 connects to another network node via a transmission lines 15 operating with an appropriate data link protocol, such as the standard HDLC protocol. One of the control modules 8 handles network control and management functions such as IBM's SNA-APPN. The other control module 7 connects to nodes operating with "foreign" protocols such as the standard X25. In the following text, we elaborate on each of these components and functions.

Figure 2:
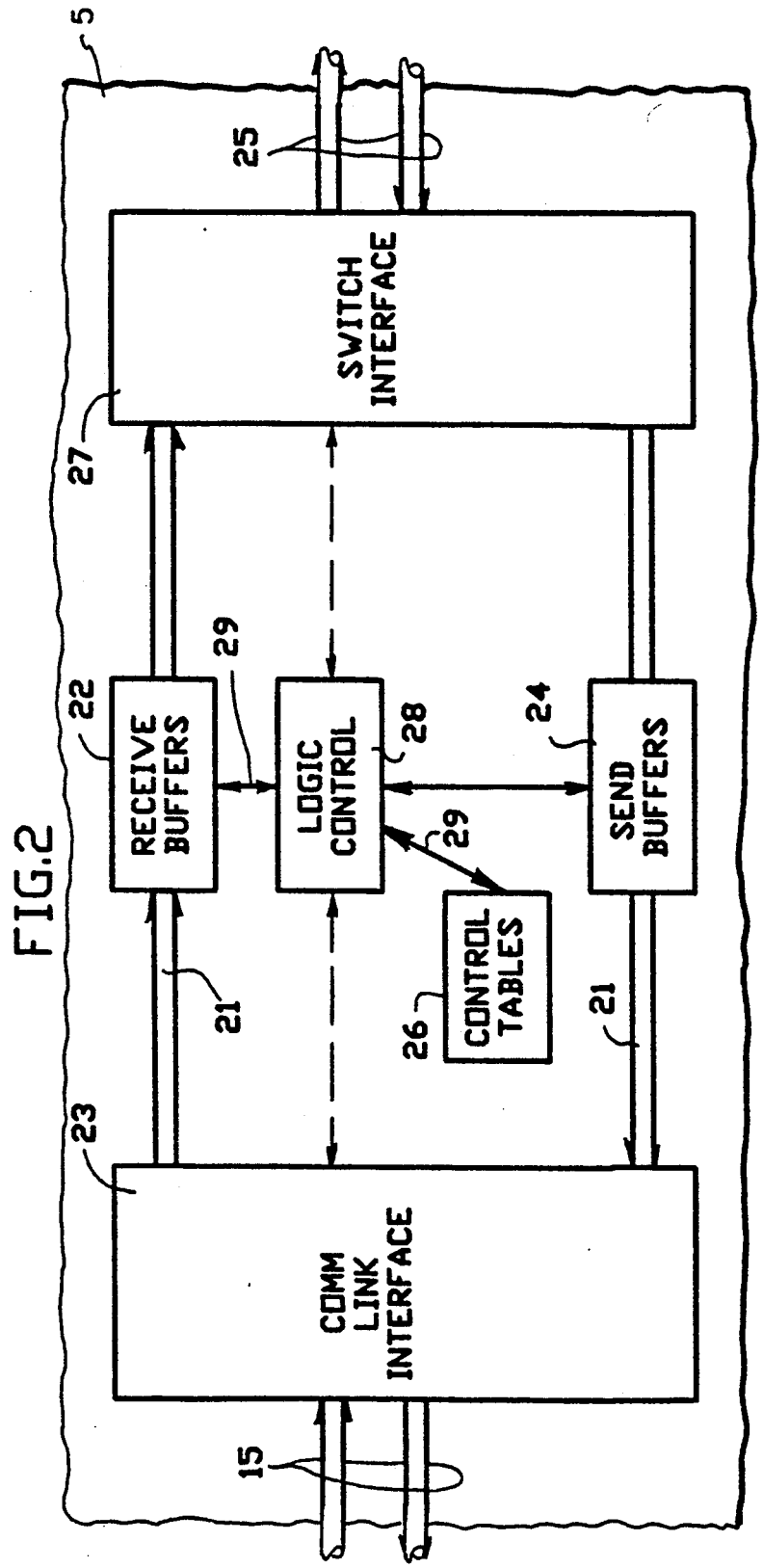
FIG. 2 is a schematic representation of the line adaptor module (LAM).

Referring to FIG. 2, each line adapter module (LAM) 5 has a communication link interface 23 providing for communication with other Network Nodes or compatible End Nodes, and a switching interface 27 providing for communication with any of the other LAMs or control modules through the switching fabric within the same Network Node. The switch interface 27 provides the logic to interface the receive (22) and send (24) buffers with the switching fabric, while the communications link interface 23 provides the logic to interface the receive and send buffers with transmission line 15.

A transmission line 15, which could typically carry a DS3 signal, may span a large physical distance, so that the propagation delay time for a packet to pass from one transmission line interface through a transmission line and arrive at the "other" end's transmission line interface may be several or many "packet transmission times." By packet transmission time we mean (packet size in bits)/(data rate of transmission interface in bits per second).

On the other hand, all the components of a Network Node are in close physical proximity to one another, so that propagation delay time between LAMs within the Network N connected by the switching fabric is less than one "packet transmission time." This property and the basic requirement that a Network Node provide efficient routing and fair scheduling of data packets gives rise to the need for an intra-node pacing scheme to be practiced by LAMs communicating via the switching fabric of a Network Node.

Again referring to FIG. 2, besides the switch and transmission line interface, each LAM contains numerous packet buffers (see 22 and 24), control tables 26 and logic control 28, which, for example, could be a microprocessor such as INTEL 80960CA. There are (at least) enough receive packet buffers 22 to accommodate the number of packets that can be transmitted on the LAM's transmission line during the "round" trip propagation delay time to the LAM on the "other end". There are (at least) enough send packet buffers 24 to accommodate the number of packets that can be transmitted during the propagation delay time of the switching fabric. The send and receive buffers could be standard S-RAMs.

The control tables 26 and logic control 28 completely provide for the execution of the network routing procedures, the link flow control protocols, and the intra-node pacing protocols. Once virtual circuits and buffer classes are "set up," packet flow is controlled completely by the LAMs, transmission lines, and the switching fabric hardware.

FIG. 2 also shows the organization of a LAM. The wide arrows 21 indicate the main data paths through the LAM, while the other arrows 29 indicate the flow of control information and signals.

Referring back to FIG. 1, control module 8 may embody processors and storage required for Network Control and/or Network Management functions. Additionally, a control module 7 may contain interfaces to communication lines that are not "plug" compatible with LAMs. In this case the control module performs protocol conversion(s) to allow for connectivity to foreign networks, or end nodes utilizing physical, data link, or foreign network protocols. Each control module contains a switching "fabri" interface providing for exchange of information with any of the other LAMs or control modules within the same Network Node housing.

We will refer to field x of packet p by the notation p.x. For example, the type field of a packet named p is denoted by p. type.

FIG. 3 shows the layout of some parts of the incoming and outgoing session tables that reside within each LAM of a high speed network node.

The Incoming Session Table(IST), shown in FIG. 3.1 is indexed by the incoming session identifier. There are entries for M incoming sessions which are numbered and whose identifiers are 0,1,2, ..., M−1. For each established incoming session the control logic of the LAM can rapidly look-up the corresponding outgoing session identifier (o-sid) and the outgoing LAM (O-LAM) to which data packets will be forwarded. Each entry of the Incoming Session Table also contains the number of packets queued for forwarding (q-size) and a representation of the queue of these packets (q-anchors). The packets themselves are queued in the receive buffers area of the LAM, shown in FIG. 2. The Incoming Session Table also includes "other information" related to the windowing and inter-nodal pacing.

We will refer to field x of the i'th entry of table T by the notation T.i.x. For example, the queue size field for session 3 in the Incoming Session Table IST is denoted by IST.3.q-size.

The Outgoing Session Table (OST) shown in FIG. 3.2 is indexed by the outgoing session identifier. There are entries for N outgoing sessions which are numbered and whose identifiers are 0,1,2, ..., N−1. For each established outgoing session the control logic of the LAM can rapidly look-up the corresponding incoming session identifier (i-sid) and the incoming LAM (I-LAM) from which data packets will be arriving across the switching fabric. Each entry of the Outgoing Session Table also contains a READY bit. The Outgoing Session Table also includes "other information" related to the windowing and inter-nodal pacing.

Below, we disclose a new intra-node pacing scheme for hardware structures that have multiple processors and distributed buffers, such as the type described above.

Consider the structure depicted in FIG. 2. Typically, a data packet is received via a transmission line 15 and enqueued by a LAM 5. The incoming LAM (I-LAM) executes the link flow control and the intermediate routing function such as local identifier swapping. See A. Baratz, J. Gray, P. Green, J. Jaffe and D. Pozefsky, "SNA Networks of Small Systems," IEEE JSAC, vol. SAC-3, No. 3, May 1985. The packet will be transmitted by a different LAM, an outgoing LAM, (O-LAM), to the specified next network node. The transmission scheduling is performed at the O-LAM. For each selected session, the O-LAM signals the corresponding I-LAM to forward a packet of the specified session. Only then can the I-LAM forward a data packet across the switching fabric. This signalling and packet delivery across the switching fabric is the termed intra-node pacing.

The scheme of this invention maintains the READY bits by sending control messages between LAMs. We define two types of control messages, SR and YT, as follows:

SR: Session Ready: a control message sent by an I-LAM to an O-LAM, an SR indicates that one or more data packets are queued at the I-LAM for transmission on a particular session. An SR control message contains its (self-identifying) type and a session identifier. As we shall describe below, an SR may often be "piggybacked" along with a data packet transfer to reduce switching fabric overhead as shown in FIG. 4.3. An SR control message can also be sent in a separate packet; this message is then referred to as an isolated SR control message. See FIG. 4.1.

YT: Your Turn: a control message sent by an O-LAM to an I-LAM. A YT control message (see FIG. 4.2) gives the "go ahead" to the I-LAM to pass the next queued data packet for a particular session across the switching fabric to the O-LAM. A YT control message contains its (self-identifying) type and a session identifier.

A LAM performs scheduling only among its ready (READY=YES) outgoing sessions. (With respect to these sessions it is the O-LAM.) To schedule a packet for transmission on a selected session, the O-LAM sets the READY bit to NO and then sends a YT control message across the switching fabric to the corresponding I-LAM. Acting upon receipt of the YT control message, the I-LAM forwards the next queued data packet for the selected session across the switching fabric to the O-LAM. If there are additional data packets already queued for the same session at the I-LAM, the I-LAM piggybacks an SR control message for the selected session. See FIG. 4.4. The piggybacked SR immediately follows (or is embedded within) the data packet. Notice that the overhead of piggybacking an SR with a data packet is negligible because no extra switching fabric connection setup is required and the SR is very short, i.e., an SR carries very few bits of information. If the session queue at the I-LAM becomes empty upon forwarding the packet, no control message is piggybacked. See FIG. 4.3. Correspondingly, when the data packet is received by the O-LAM, READY is set to YES if an SR is piggybacked; otherwise, READY remains set to NO.

In case an SR is not be piggybacked, then later, when the queue of the session. at its incoming LAM changes state from empty to non-empty, the I-LAM sends an "isolated" SR control message across the switching fabric to the corresponding O-LAM, which will thereupon set READY to YES for the selected session. See FIG. 4.1. (This, of course, also describes the situation for the first data packet of the session—where READY must be initially set to NO in the O-LAM.) In this "worse" case, each data packet that traverses the switching fabric will be preceded by one exchange of SR and YT control messages—however, the SR and YT messages will typically contain very few bits compared to a data packet. Furthermore, this "worse" case only occurs when a session is "mostly idle!"

Message Formats and Data Structures

FIG. 4 shows the formats of some of the messages that flow from LAM to LAM across the switching fabric of a high speed network node for data flow and intra-node pacing. Each message contains a type field so that each message is self-describing. As discussed above there is an Isolated Session Ready control message (type I-SR). See FIG. 4.1. Data packets without Session Ready piggybacking are type D. See FIG. 4.3. We represent a data packet with Session Ready piggybacked as the separate type D-SR. See FIG. 4.4. An alternative would be to have a separate field within (or trailing) a data packet to carry a Session Ready option bit.

Control Procedures

The following describes those procedures executed by the Intra-Nodal pacing of data. Session setup and other supervisory procedures are also executed by the control logic of the LAM. These set up and supervisory procedures are well known to those skilled in the art.

Packet Arriving at LAM from Communication Link Interface

Whenever a data packet arrives from the communications link interface (see 23 of FIG. 2) the following procedure is executed:
1. Let the Incoming Session Table be called IST. Let the arriving packet be named P. Let I=P.session-id, the incoming session identifier number. Append P to the queue represented by IST.I.q-anchor.
2. If the queue size IST.I.q-size changed from 0 to 1 as a result of the previous step then build an Isolated SR control message called M, with M.type=I-SR and M.session-id=J where J=IST.I.o-sid, the outgoing session identifier of the incoming session I. Send message M across the switching fabric to the outgoing LAM identified by IST.I.o-lam.
3. Otherwise, if IST.I.q size did not change from 0 to 1, there is no need to send an Isolated SR message because the queue was non-empty before P arrived and we must have already informed the outgoing LAM of this fact.

Packet Arriving at LAM from Switch Interface

Whenever a data packet arrives from the switch link interface the following procedure is executed:
1. Let the Incoming Session Table be called IST. Let the Outgoing Session Table be called OST. Let the arriving packet be named P. Let I=P.session-id, be either the incoming or outgoing session number of the packet, depending on its type. Let T=P.type. Execute one of the following steps depending on the packet type T.
2. If T=I-SR, an isolated session ready message packet. Set OST.I.READY=YES. The outgoing LAM for this session is now informed that there is at least one packet queued at the incoming LAM.
3. If T=YT, a "your turn" control message packet. Perform the following (sub) steps.
    a. Dequeue a packet from the queue represented by IST.I.q-anchor. Call it P. IST.I.q-size will be decremented by one as a side effect of this dequeuing.
    b. If IST.I.q-size is not zero, then set P.type=D-SR. This data packet will carry the "session ready" information that there are packets for the same session queued "behind it".
    c. Otherwise, the queue has "gone empty", and the packet type is set as P.type=D.
    d. Set P.session-id=IST.I.o-sid. The session identity of the packet is changed in preparation for its transmission on the outgoing communication link.
    e. Send packet P across the switching fabric to the outgoing LAM identified by IST.I.o-lam.
4. T=D, a data packet without session ready piggybacked.
    Transfer packet P to the send buffers 24 packet shown in FIG. 2. The communications link interface (see 23 of FIG. 2) continually "services" the send buffers 24 by dequeuing available packets and transmitting them on the transmission line attached to the LAM. This packet does not affect the ready bit in the outgoing session table entry for the corresponding session.
5. T=D-SR, a data packet with session ready piggybacked.
    Set the packet type to T=D. The session ready information shouldn't be passed to the communications link interface. Transfer packet P to the send buffers.
    Set OST.I.READY=YES. Thus, the outgoing LAM for this session is now informed that there is at least one more packet queued at the incoming LAM.

Communications Link Transmission Scheduling

The number of uncommitted packet buffers in the send buffers (See 24 of FIG. 2) is kept in a counter called NUX that is accessible to the logic control section (See 28 of FIG. 2) of the LAM. When the LAM is "initialized", NUX is set to the total number of packet buffers physically present in the send buffers area. Whenever a data packet departs from the LAM to the Communications Link interface, a signal is sent from the Communications Link interface to the logic control section, whereupon the NUX counter is incremented by one. That is, whenever a packet leaves the LAM via the communication link interface the operation Set NUX=NUX+1 is executed.

Whenever NUX>0 and OST.J.READY=YES for some J, the logic control section of the LAM chooses one such J. The entry chosen can depend on the session priority or class of service and/or be arranged so as to give each "active session" fair access to the transmission facility of the LAM and/or be limited by the pacing considerations. Having chosen such J the control section executes the following procedure:

1. Set NUX=NUX−1. Count one packet send buffer as committed.
2. Set OST.J.READY=NO. Reset the READY bit for outgoing session J. It will be flipped YES when another "session ready" indication arrives at this LAM.
3. Build a "your turn" control message called M, with M.type=YT and M.session-id=OST.J.i-sid. Send message M across the switching fabric to the incoming LAM identified by OST.J.i-lam. This will cause the incoming LAM to Send the next data packet for the selected session across the switching fabric as described above.

Having thus described out invention, what we claim as new and desire to secure by Letters Patents is:

1. A method of controlling the transmitting of packets between line adaptor modules of a network node, comprising the steps of:
   (a) transmitting N SR control messages for N sessions from a set of said modules to one of said modules, with N being an integer greater than one and with each module of said set having at least one packet in its buffers to be transmitted to said one module;
   (b) setting N ready bits in said one module to a ready equals yes state if said N SR control messages are received by said one module, each bit of said ready bits in said ready equals yes state indicating that a corresponding session from a module of said set has at least one packet in its buffers to transmit to said one module for said session;
   (c) transmitting a YT control message to a selected module of said set for a selected one of said sessions if a corresponding one of said ready bits is set to said ready equals yes state in said one module; and
   (d) transmitting a packet for said one session from said selected module to said one module if said YT control message is received by said selected module.

2. A method as recited in claim 1, further comprising the step of setting said one ready bit to a ready equals no state, when transmitting said YT signal to said selected module, in which ready equals no state, no further YT signal will be transmitted to said selected module for said one session.

3. A method as recited in claim 1, wherein an SR control message of said SR control messages is an isolated control message if a module of said set receives a packet to be transmitted to said one module for a session of said sessions after having no packets to be transmitted to said one module for latter said sessions.

4. A method as recited in claim 1, wherein said SR control message is transmitted within a particular data packet being transmitted for a session of said sessions from a module of said set when latter said module still has more packets stored therein for latter said session to transmit to said one module after having released said particular packet from storage.

5. A network node for controlling the transmission of packets between transmission lines in contact with said node comprising:
   a plurality of modules, each module in contact with at least one of said lines, each module comprising:
   (a) means for transmitting N SR control messages for N sessions from a set of said modules through said switching fabric to one of said modules if each module of said set has at least one packet in its buffers to be transmitted to said other module, with N being an integer greater than one;
   (b) means for setting N ready bits in said one module to a ready equals yes state if said N SR control messages are received by said one module, each of said ready bits in said ready equals yes state indicating that a corresponding session from a module of said set has at least one packet in its buffers to transmit to said one module for said session;
   (c) means for transmitting a YT control message through said switching fabric to a selected module of said set for a selected one of said sessions if a corresponding ready bit in said one module is set to said ready equals yes state; and
   (d) means for transmitting a packet from said selected module for said selected session to said one module if said YT control message is received by said selected module.

6. A method of transmitting packets between line adaptor modules of a network node, comprising the steps of:
   (a) transmitting N SR control messages from a set of said modules to one of said modules with N being an integer greater than one and with each module of said set having at least one packet in its buffers to be transmitted to said one module, each of said control messages being an isolated SR control message if a module from which said control message is transmitted receives a data packet destined for said one module for a corresponding session after having no stored packets destined for said module for said corresponding session, each of said control messages being transmitted as part of a transmitted data packet if said module from which said control message is transmitted still has a stored packet destined for said one module for a corresponding session after removing said transmitted packet from its buffers;
   (b) setting N ready bits in said one module to a ready equals yes state if said N SR control messages are received by said one module, each bit of said ready bits in said ready equals yes state indicating that a corresponding module of said set has at least on packet in its buffers to be transmitted to said one module for a corresponding session;
   (c) transmitting a YT control message to a selected module of said set if a corresponding ready bit in said one module is in said ready equals yes state; and
   (d) transmitting a data packet from said selected module to said one module when said selected module receives said YT control message.

* * * * *